UNITED STATES PATENT OFFICE.

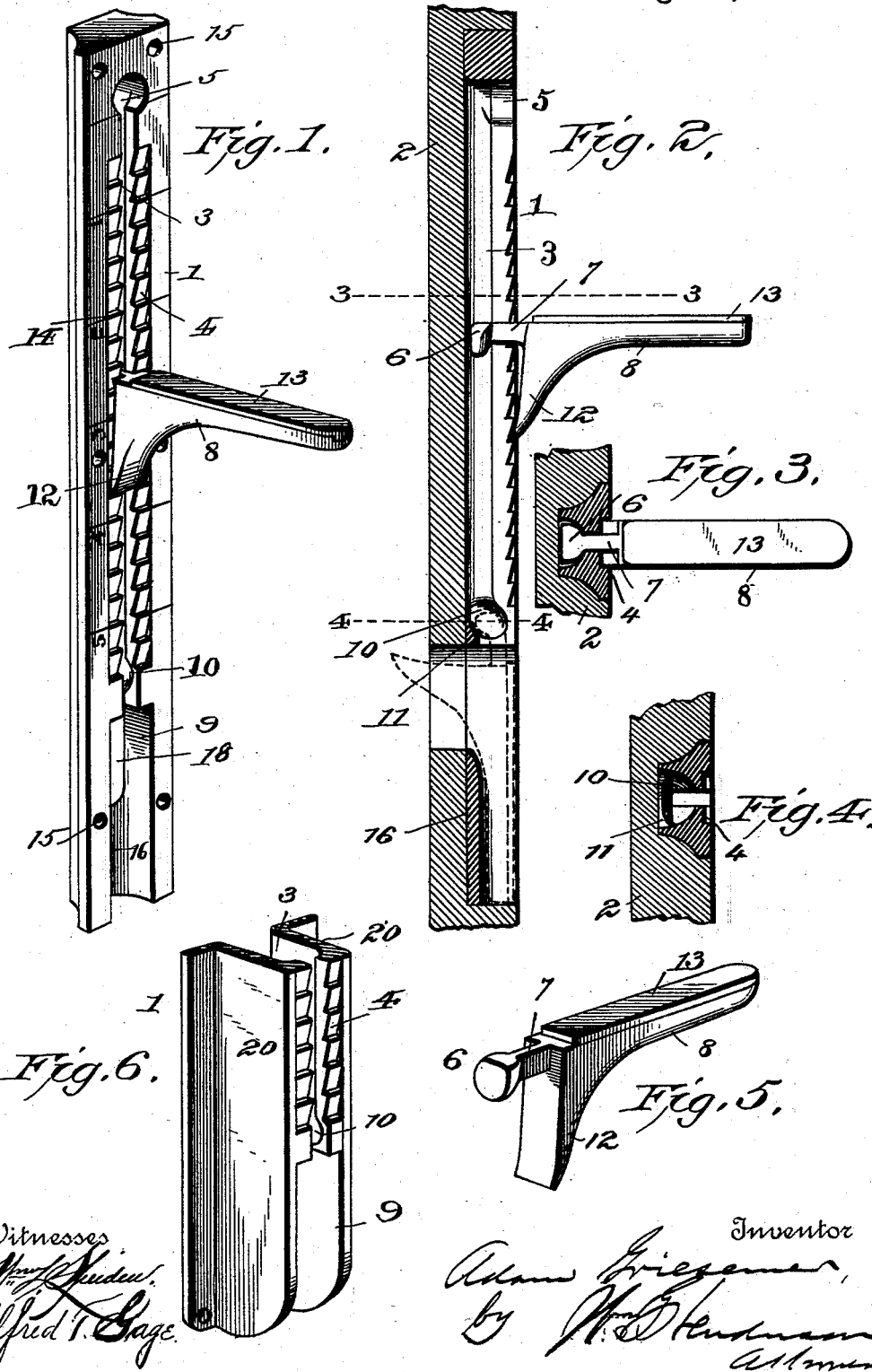

ADAM GRIESEMER, OF PUEBLO, COLORADO, ASSIGNOR OF ONE-HALF TO WILLIAM G. RIPPEY AND JOHN W. LUCKEY, OF SAME PLACE.

BRACKET OR REST FOR WORK-BENCHES OR OTHER PURPOSES.

SPECIFICATION forming part of Letters Patent No. 525,014, dated August 28, 1894.

Application filed April 11, 1894. Serial No. 507,096. (No model.)

*To all whom it may concern:*

Be it known that I, ADAM GRIESEMER, a citizen of the United States, residing at Pueblo, in the county of Pueblo and State of Colorado, have invented certain new and useful Improvements in Brackets or Rests for Work-Benches or other Purposes; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an adjustable rest or bracket which is particularly well adapted for work benches but may be employed for other uses, and it has for its object to produce such a bracket or rest in which the bracket or rest arm when not in use may be dropped and have its face brought flush with or below the face of the rack on which the arm is adjustable so that the arm will be out of the way and free from being an obstruction.

To the accomplishment of the foregoing and such other objects as may hereinafter appear, the invention consists in the construction and the combination of parts hereinafter particularly described and then sought to be specifically defined by the claims, reference being had to the accompanying drawings, forming a part hereof, and in which—

Figure 1 is a perspective of the rack and the bracket or rest arm sustained laterally therefrom. Fig. 2 is a vertical section through Fig. 1 and a portion of a bench to which the device is applied with the arm shown in full lines in one position and in dotted lines in another position. Fig. 3 is a horizontal section on the line 3—3 of Fig. 2, showing however both sides of the rack. Fig. 4 is a horizontal section likewise taken on the line 4—4 of Fig. 3. Fig. 5 is a perspective of the bracket or rest arm; and Fig. 6 is a perspective of a portion of a modified form of rack for the bracket or arm.

In the drawings, the numeral 1 designates the rack which is usually made of metal and preferably of the form illustrated in Fig. 1 of the drawings which adapts it to be set into the side of a work bench 2 so that its outer face will lie flush with the outside face of the work bench as illustrated in Fig. 2 of the drawings. This rack is formed with a longitudinally extending slot 3, the rack on opposite sides of the slot being formed with a series of ratchet teeth 4, the upper end of the slot being formed with an enlarged opening 5 for the insertion of the head 6 of the shank 7 of the bracket or rest arm 8 so that when the shank 7 is moved down in the slot 3 the bracket or rest arm cannot be drawn laterally out of place.

The lower portion of the rack is formed with an elongated opening or recess 9 extending in the direction of the length of the rack and of such dimensions in cross sections that it will receive the bracket or rest arm and allow the same to lie or hang downward in the elongated recess so that the bracket or rest arm will be flush with or below the face of the rack and thus practically be contained entirely within the rack in the manner as illustrated by dotted lines in Fig. 2 of the drawings whereby the arm is prevented from forming an obstruction or projection beyond the face of the rack when the arm is not in use.

The portion of the rack back of the ratchet teeth 4 or serrations will be sufficiently enlarged to permit the head or knob 6 of the arm to move freely therein in the upward and downward adjustment of the bracket or rest arm and at the lower portion of the slot 3 and to the back thereof the rack is formed with a cavity or socket 10 for the head or knob of the arm to turn in as a pivot so that the bracket or rest arm will be free to swing downward and back into the elongated recess 9, the construction at that point being such that the head or knob cannot be drawn out of the cavity or pocket in which it fits when in its swinging position, this being effected by means of a cross piece or strip 11, or otherwise.

The bracket or rest arm 8 is formed at its lower portion forward of the head or knob 6 with a heel 12 which serves as a pawl to the bracket or rest arm to engage with the ratchet teeth or serrations 4 so as to sustain the bracket or rest arm at the height to which it may be adjusted. It is preferred to provide the face of the arm 3 with a facing 13 of rubber or other suitable material which will prevent the lumber or other article that may rest upon the arm from becoming defaced or injured by contact with the metal of which the arm is made, and I prefer to make a scale indicated by the numeral 14 on the face of the rack so as to facilitate in adjusting the rest arm to the height desired, which scale may represent inches and the ratchet teeth or serrations between the numerals of the scale fractional parts of an inch.

In practice the side of the work bench will be recessed or cut out so that the rack may fit therein so as to be flush with the side of the bench, the rack being held in place for instance by screws passed through the holes 15 made in the rack and into the work bench.

The attachment described is particularly well adapted for use in connection with work benches so as to sustain one end of a piece of lumber that may at the other end be held in the ordinary work bench vise, the lower edge of the piece of lumber resting upon the arm 8 and held at the height desired by adjustment of said arm. The attachment can also be used by being set in to the top of the work bench, the rack being set into a recess cut therein so that its top face will lie flush with the top of the bench, and when the arm is turned down it will lie in the elongated recess 9 so that its face will be flush with the top of the bench. The lower portion of the rack at the bottom of the elongated recess at a point below the opening 18 in which the heel 12 of the arm lies is provided with a web 16 which will prevent the bracket or rest arm from swinging backward out of the elongated recess as illustrated in Figs. 1 and 2 of the drawings.

When the attachment is used on top of the work bench, the arm 8 may serve to hold the rear end of a piece of lumber and to press the same forward against the ordinary bench-stop commonly used when lumber is being planed.

While the attachment is more particularly well adapted for use as a rest for a work bench still it is obvious that it can be used as a bracket for other purposes, and under all the circumstances will permit the bracket or rest arm to swing downward and hang so as to lie inside of the elongated recess flush with the face of the bracket. By being made to hang or swing inward and into the elongated recess when not in use the liability of the arm to be accidentally thrown outward is guarded against as gravity will hold it in the elongated recess.

As a modified form of the rack, I may employ the construction illustrated in Fig. 6 of the drawings wherein the opposite walls 20 of the slot 3 project outward from the base or rear face of the rack 1, these walls at the lower portion of the rack below the serrations or apertures 4 forming the elongated recess 9 for the bracket or rest arm to lie in. This form of rack will in other respects be formed in the same manner as the form of rack illustrated in Fig. 1 and other figures of the drawings.

The attachment constructed as described forms a simple and efficient bracket or rest for the various uses to which it is adapted and the cost of manufacturing the same is comparatively little.

I have illustrated and described the preferred construction in the several parts but it is obvious that departures can be made from the exact details without departing from the features of my invention.

Having described my invention and set forth its merits, what I claim is—

1. The within bracket or rest for work benches and other purposes consisting of a rack formed with a longitudinal slot and having an elongated recess at its lower portion in combination with an arm having a shank to work in the slot of the rack and a head or knob fitting back of the teeth of the rack and formed with a heel or pawl to engage said teeth, said arm adapted to swing from the rack and lie in said elongated recess when not in use, substantially as and for the purposes described.

2. The bracket or rest composed of the rack formed with a longitudinal slot and ratchet teeth and having at one end an elongated recess having a web at its base in combination with an arm having a shank and knob at its rear and provided with a heel or pawl to engage the teeth of the rack, the arm being adapted to swing downward and lie in said elongated recess against said web, substantially as and for the purposes described.

3. The bracket or rest composed of the rack having a longitudinal slot and ratchet teeth and formed at one end with an enlarged opening and at the other end with an elongated recess and a socket in combination with an arm formed with a shank and a knob at the end thereof and a heel or pawl, the shank of the arm adapted to move in said slot and the knob to pass through the enlarged opening thereof and to turn in the socket at the other end and the arm adapted to lie in said elongated recess and the heel or pawl to engage the teeth of the rack, substantially as and for the purposes described.

In testimony whereof I affix my signature in presence of two witnesses.

ADAM GRIESEMER.

Witnesses:
A. J. LANGDON,
J. J. LANGDON.